United States Patent [19]

Roy

[11] Patent Number: 4,494,704

[45] Date of Patent: Jan. 22, 1985

[54] PROCESS AND DEVICE FOR MANUFACTURING MOTHER CAPACITORS BY HELICAL WINDING

[75] Inventor: Claude Roy, Bagnolet, France

[73] Assignee: L.C.C.-C.I.C.E.-Compagnie Europeenne de Compsants Electroniques, Bagnolet, France

[21] Appl. No.: 457,476

[22] Filed: Jan. 12, 1983

[30] Foreign Application Priority Data

Jan. 12, 1982 [FR] France ................. 82 00374

[51] Int. Cl.³ .............. B65H 19/04; B65H 35/02; H01G 13/00
[52] U.S. Cl. ................. 242/56.1; 29/25.42; 156/522; 242/56.9
[53] Field of Search ............ 242/56.1, 56.9; 29/25.41, 25.42; 156/446, 184, 519, 522

[56] References Cited

U.S. PATENT DOCUMENTS

| 3,128,218 | 4/1964 | McGraw, Jr. | |
| 3,274,816 | 9/1966 | Held | |
| 3,670,378 | 6/1972 | Behn et al. | 29/25.42 |
| 3,728,765 | 4/1973 | Behn et al. | 29/25.42 |
| 3,871,594 | 3/1975 | O'Neil et al. | 242/56.9 X |
| 3,901,757 | 8/1975 | Eglinton | 156/446 |
| 3,991,952 | 11/1976 | Attman et al. | 242/56.9 |
| 4,093,141 | 6/1978 | Garrett, Sr. et al. | 242/56.9 |
| 4,203,206 | 5/1980 | Morris et al. | 242/56.1 |
| 4,403,270 | 9/1983 | Kessler | 361/328 |

FOREIGN PATENT DOCUMENTS 2845695 4/1980 Fed. Rep. of Germany .
2011553 3/1970 France .

Primary Examiner—John M. Jillions
Assistant Examiner—Lloyd D. Doigan
Attorney, Agent, or Firm—Oblon, Fisher, Spivak, McClelland & Maier

[57] ABSTRACT

The present invention provides a process and a device for manufacturing superposed mother capacitors comprising the helical winding of metalized films on a wheel as well as periodic interpositioning of an insert. The position of an interpositioning device is made dependent on the position of the external layer of the winding, and at least a first means is moved from a rear position to a forward position. The first means may carry a second means and the travel paths of the first and second means may be adjusted by cams, more particularly for positioning a cutting device carried by said first means.

22 Claims, 10 Drawing Figures

PROCESS AND DEVICE FOR MANUFACTURING MOTHER CAPACITORS BY HELICAL WINDING

BACKGROUND OF THE INVENTION

The present invention relates to a process and device for manufacturing mother capacitors by helical winding.

A process is known, for the SIEMENS patent application No. 2 011 553 published on Mar. 6, 1970, for manufacturing laminated capacitors by helical winding on a roller, with insert layers without capacitive effect interpositioned between several of the dielectric layers and plate layers which form a block, so that these separating or insert layers divide the block into several superposed mother capacitors. Then the side edges of the layers are completely covered with a contact metal and finally the mother capacitors are separated and cut up into individual capacitors.

The introduction of the insert layer may be made manufacturally. Such an operation is time-consuming and requires the presence of a trained operator.

The present invention relates to a process and a device that do not present the above-mentioned drawbacks.

SUMMARY OF THE INVENTION

The invention provides a process for manufacturing superposed mother capacitors, comprising helical winding of metalized films on a wheel as well as periodic interpositioning, after a given number of winding revolutions, of an insert having a leading edge and a rear edge, wherein an operation is used for making the position of an insert interpositioning device dependent on the position of the external layer of the winding, and an operation for interposing an insert comprising the steps of stopping the wheel, moving the interpositioning device from a rear, so-called rest, position to a forward position for presenting the insert by its leading edge, again rotating the wheel for interpositioning of the insert and moving the interpositioning device to its rear position so as to continue the winding of the films.

The operation for interpositioning an insert may comprise an operation for raising a presser roller of the film for presenting the insert thereunder. It may comprise a step for cutting the insert. Said cutting may be accomplished with a length increasing linearly with the radius of the external layer of the winding, so that the rear edges of the successive inserts are aligned along a radius of the wheel. The interpositioning device may comprise a cutting device and a mobile clip for feeding the insert, the interpositioning device may comprise cams forming front and rear stops, and the cutting step then uses the steps of rotating the wheel through a fraction of a turn, stopping the wheel again, cutting the insert, the interpositioning device being against its front stop, and again setting the wheel in rotation, and the profile of the cams is chosen so that the insert is cut by the cutting device to a length such that, after winding, the rear edges of the successive inserts are located along the same radius of the wheel.

The presentation of the insert may be advantageously carried out by overshooting the point where it is tangent to the external layer of the winding, so that a segment of the insert is nipped by the presser roller so as to begin the winding.

According to a preferred embodiment, the overshoot is proportional to the radius of the external layer of the winding, so that the leading edges of the successive inserts are aligned along a radius of the wheel. The movement of the interpositioning device between the rear position and the forward position may then consist in moving a first means along a given path between a rear stop and a front stop, and in extending the movement by a second means carried by the first as far as a front stop formed by a cam so as to provide said proportional movement, the insert being advanced by a mobile clip carried by the second means, the mobile clip being for this purpose in a closed position. The movement of the interpositioning device between the forward position and the rear position may then consist in moving the second and the first means to their rer stop while maintaining the mobile clip open.

The invention also relates to a device for manufacturing superposed mother capacitors comprising a device for the helical winding of metalized films on a wheel, as well as a device for periodically interpositioning an insert after a given number of winding revolutions, for implementing the process, characterized in that the periodic interpositioning device is carried by a mobile compensating device and is capable of moving between a rear, so-called rest, position and a forward position in which the insert is presented at the point where the films join the winding, and in that it comprises a sensor detecting the position of the external layer of the winding on the wheel and control of the position of the compensating device slaved to the position of said external layer.

It may comprise a roller for pressing the stack and the point where the films join the winding is the contact point between the presser roller and the winding.

According to an advantageous embodiment, the presser roller is associated with a shaft connected to a device for applying the pressure force of the roller, and integral with the compensating device, said sensor is adapted to measure the angular position of said shaft and said slaved control is arranged to move the compensating device in a given direction so that said shaft maintains a given angular position. The sensor may be formed by two photo-electric barriers disposed on each side of the given angular position of said shaft and the slaved control is of the all or nothing type.

The device for applying the pressure force may be a stepper motor and said sensor a circuit for decoding the angular position of the stepper motor.

The interpositioning device may comprise a first means having a mobile clip for advancing the insert, a cutting device and an insert introducing device, and a fixed clip may be carried by the frame of the device.

According to a preferred embodiment, the interpositioning device comprises a first means movable between a forward stop and a rear stop, and carrying a cutting device, as well as a second means movable between a forward stop and a rear stop. The second means carries a clip for advancing the insert and an insert introducing device. A fixed clip may be carried by the frame of the device. The front stop of the second means may be a cam whose angle of slope is chosen so that the leading or input edge of the successive inserts is disposed on the same radius of the wheel. The stops of the first means may then be cams whose angle of slope is chosen so that the insert is cut by the cutting device to a length such that, after winding, the rear edges of the successive inserts are located along the same radius of the wheel.

At least one of said means may be a slide.

BRIEF DESCRIPTION OF THE DRAWINGS

The invention will be better understood from reading the following description given by way of non limiting example, with reference to the accompanying drawings in which.

DESCRIPTION OF THE PREFERRED EMBODIMENT

Figure 1:
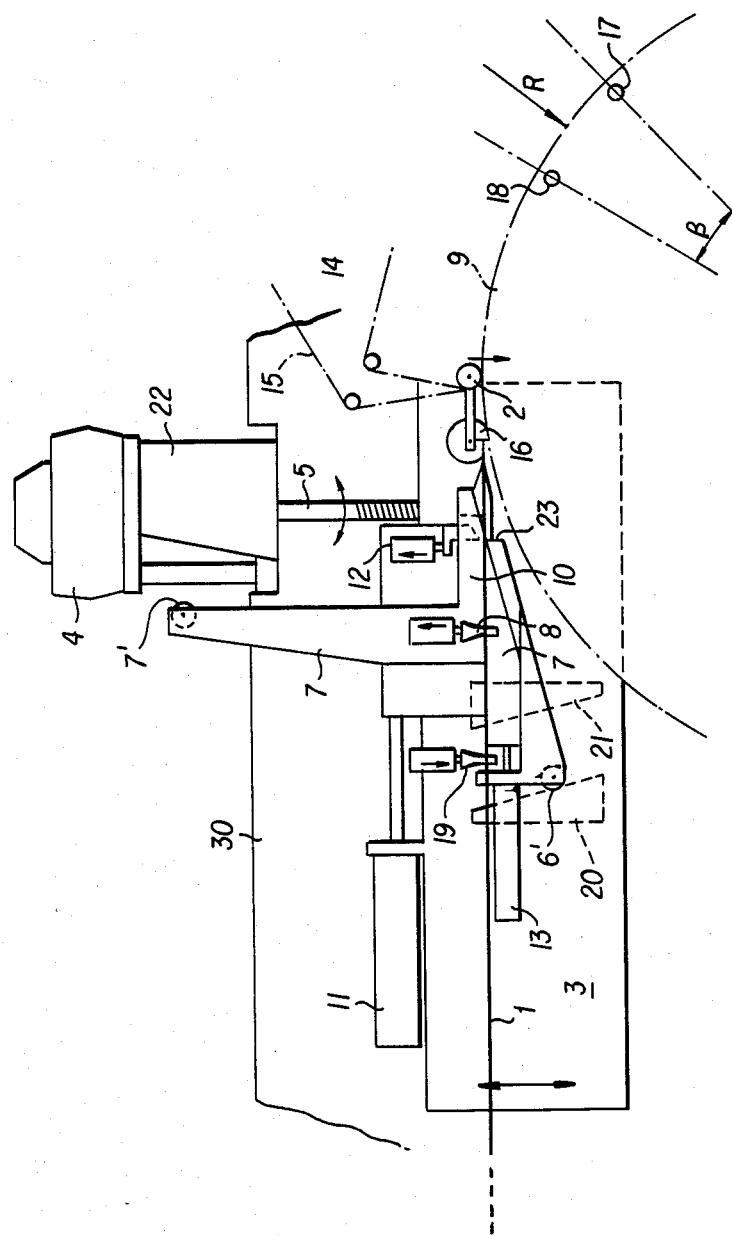
FIGS. 1 to 7 show a device according to one embodiment of the invention, showing the different steps of an insert interpositioning sequence.

FIG. 1 shows one embodiment of the device for periodically interpositioning an insert, for helically winding two films 14 and 15 on a wheel 9. The insert 1 is supplied from a ribbon carried by a reel, not shown. As a variation, the inserts 1 may be pre-cut to desired lengths. Films 14 and 15 are brought to the level of a presser roller 2 associated with a device 16 for applying a pressure force, so as to press at all times films 14 and 15 against the preceding turns of the winding. Films 14 and 15 are moreover delivered at a constant tension which ensures homogeneous winding on wheel 9. The angular position of shaft 2' (see FIG. 8b) associated with the presser roller is determined by a measuring device which may be formed by two opto-electronic barriers disposed on each side of a given angular position of arm 2'. According to a preferred embodiment, device 16 is a stepper motor applying a constant torque to shaft 2', and the angular position measurement is obtained by decoding the angular position of the stepper motor. The rotation of wheel 9 is interrupted after a given number of revolutions, for interpositioning an insert 1 by means of an interpositioning device carried by a mobile compensating device, in this case a main slide 3.

The positioning of the main slide 3 is made dependent on the position of the external layer of the winding on wheel 9. Since device 16 for applying a force and the measuring device are carried by the main slide 3, this latter is controlled in position along an axis such that the angular position of arm 2' remains constant.

The device for periodically interpositioning an insert carried by the main slide 3 is adapted to move between a rear, so-called rest, position and a forward position in which the insert 1 is presented at the point where the films join the winding, namely in the case in question at the level of presser roller 2. The interpositioning device is formed by a first means movable between two stops, for example a primary slide 6 and, if useful, a secondary means movable between two stops, for example a secondary slide 7 whose function will be explained in greater detail hereafter. The main slide 3 supports, besides the primary slide 6 and the secondary slide 7, a fixed clip 19. The primary slide 6 supports the secondary slide 7 and a cutting device 12. The secondary slide 7 comprises an insert guide 10, for guiding the insert 1 when introduced at the level of presser roller 2, and supports a mobile clip 8.

The main slide 3 is driven by a motor 4 coupled to a screw-nut system 5, and the primary 6 and secondary 7 slides are each driven by a piston and cylinder device, respectively 11 and 13. The primary slide 6 is movable between a rear stop 20 and a forward stop 21 integral with the frame 30 of the device. These two stops 20,21 are advantageously formed by a cam. A finger 6' carried by slide 6 cooperates to this end with stops 20 and 21.

The secondary slide 7 is movable between a rear stop 23 carried by the primary slide 6 and a forward stop 22 integral with the frame 30 of the device. The front stop 22 is formed by a cam. A finger 7' carried by slide 7 cooperates with stop 22 for this.

In FIG. 1 the device for introducing an insert is in the so-called rest position, which allows films 14 and 15 to be wound on wheel 9. The primary 6 and secondary 7 slides are against the rear stops, respectively, at 20 and 23. The fixed clip 19 is closed so as to hold the insert 1 in place. The mobile clip 8 is open. In this rest position, the screw-nut system 5 drives the main slide 3 with a translational movement so that shaft 2' is maintained permanently horizontal during winding of films 14 and 15.

The rear stop 20 of the primary slide is formed by a linear cam carried by the frame of the device. This cam is inclined so that the primary slide 6 against the rear stop moves away from wheel 9 when the main slide 3 moves away from the center of the wheel 9. More specifically, the angle of slope of cams 20 and 21 is chosen to compensate for the difference in length of the circumference of the outer layer of wheel 9 between two positions of rotation of wheel 9 detected by sensors 17 and 18. Furthermore, cam 22 contributes to a more positive introduction of the insert at the level of roller 2. The introduction of insert 1 is extended beyond the point where insert 1 arrives tangent to the wheel, by a length corresponding to a given angle of rotation of wheel 9, so that all the leaders of the successive inserts are aligned along the same radius $OB_o$ of wheel 9 (see FIGS. 8a and 9). Compensation of this length as a function of the diameter of the outer layer is provided by the linear cam 22. With this arrangement, by disposing roller 2 a little beyond the point where insert 1 arrives tangent to the wheel, insert 1 is pressed against the wheel at the beginning of winding thereof, as will be explained hereafter in greater detail. This allows the winding of the insert to be started without slipping.

Figure 2:
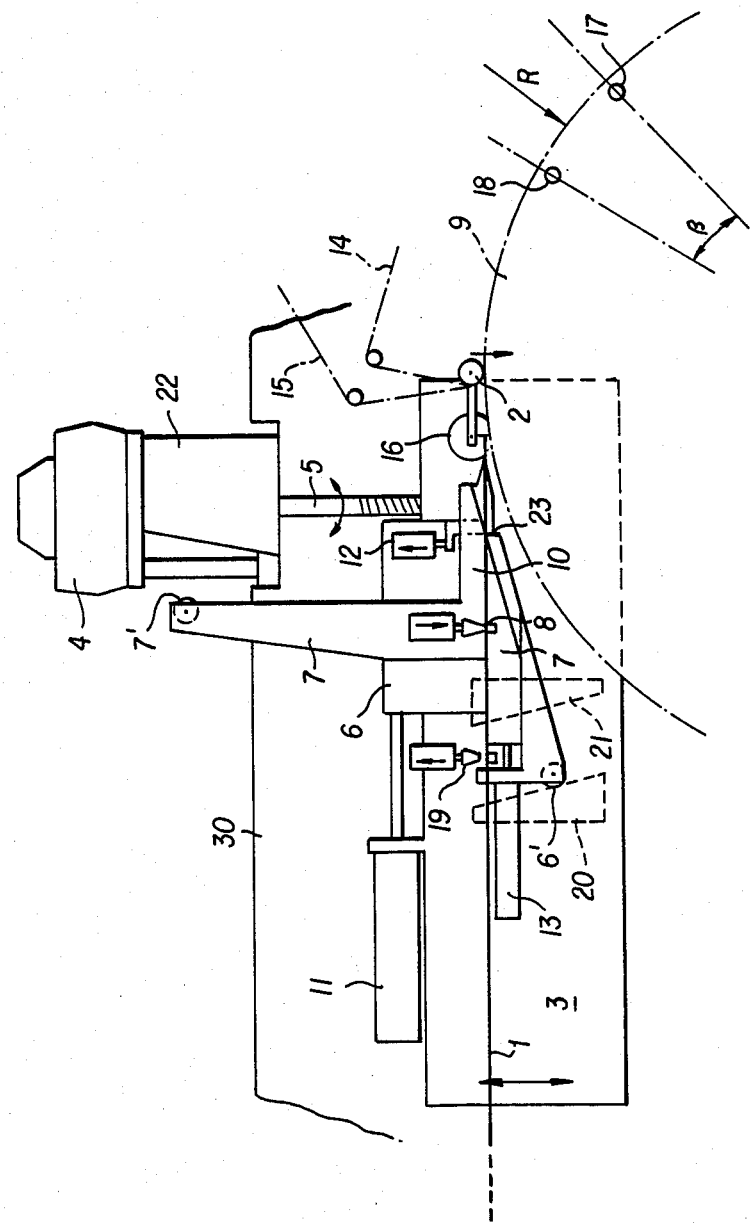
Figure 3:
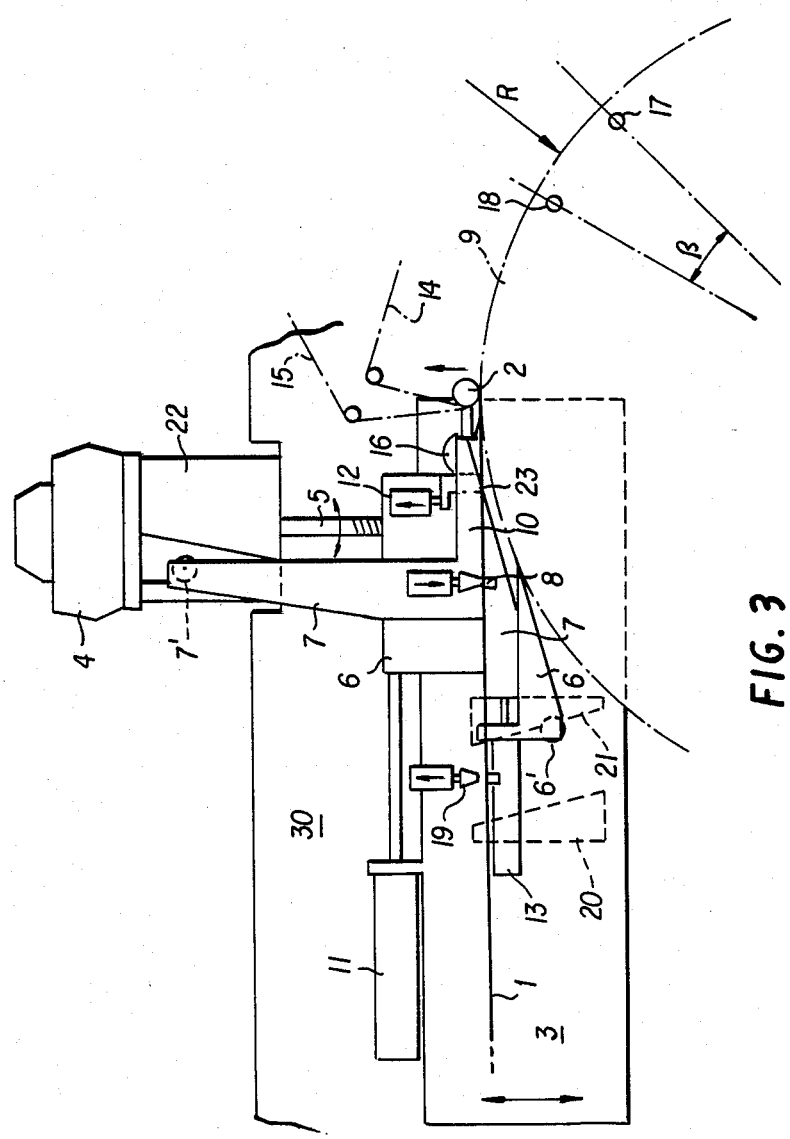

In FIG. 2, the fixed clip 19 is open and the mobile clip 8 is closed. The presser roller 2 is raised and the drive for the main slide 3 by motor 4 and the screw-nut system 5 is interrupted. A mark located on wheel 9 is indexed at a position detected by a sensor 17. The primary slide 6 is then translated (see FIG. 3) towards its forward stop 21 and the insert 1 is advanced by the mobile clip 8 over a distance equal to the distance of travel of the primary slide 6. Since the angle of slope of cams 20 and 21 is the same, this travel distance is constant whatever the diameter of the external layer of films 14 and 15. The end of insert 1 is then located approximately in tangential contact with the outer layer of films 14 and 15.

Figure 4:
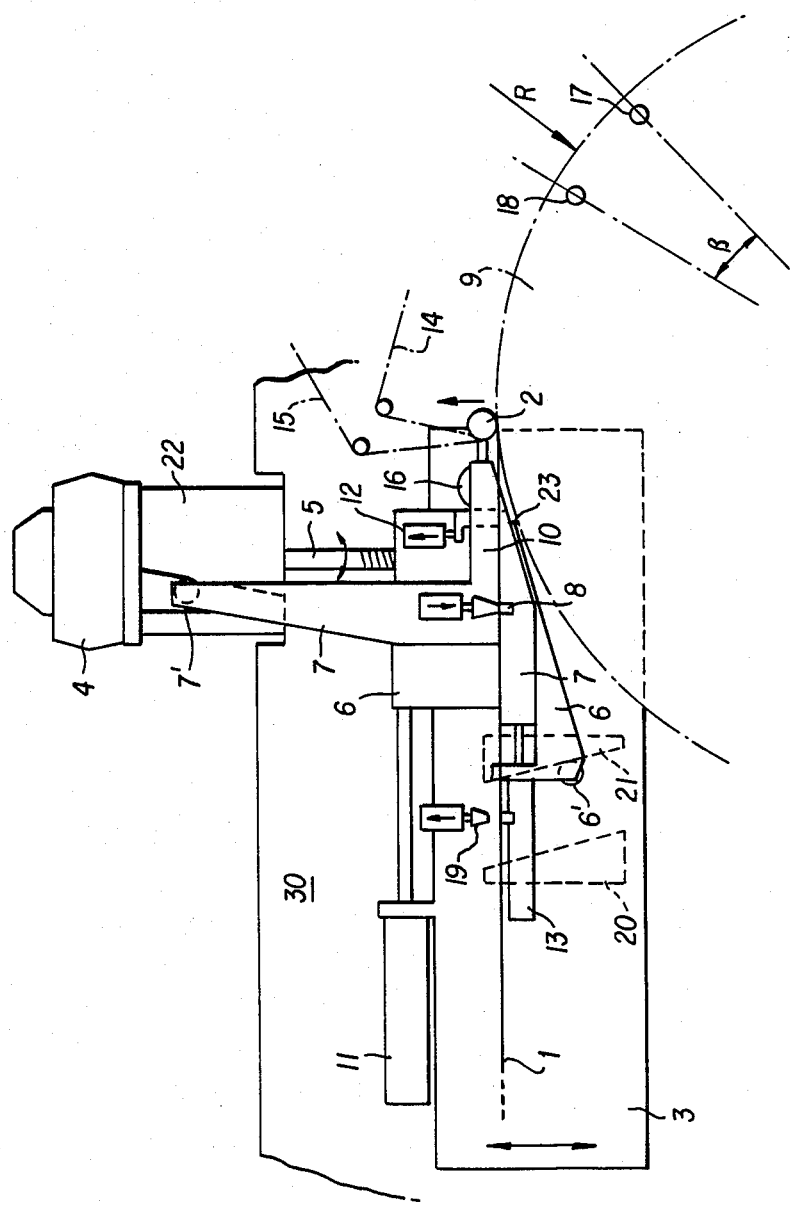

The secondary slide 7 is then translated (see FIG. 4) to its front stop 22 and insert 1 is consequently advanced by the mobile clip 8 over a complementary distance which brings its end below roller 2.

Figure 5:
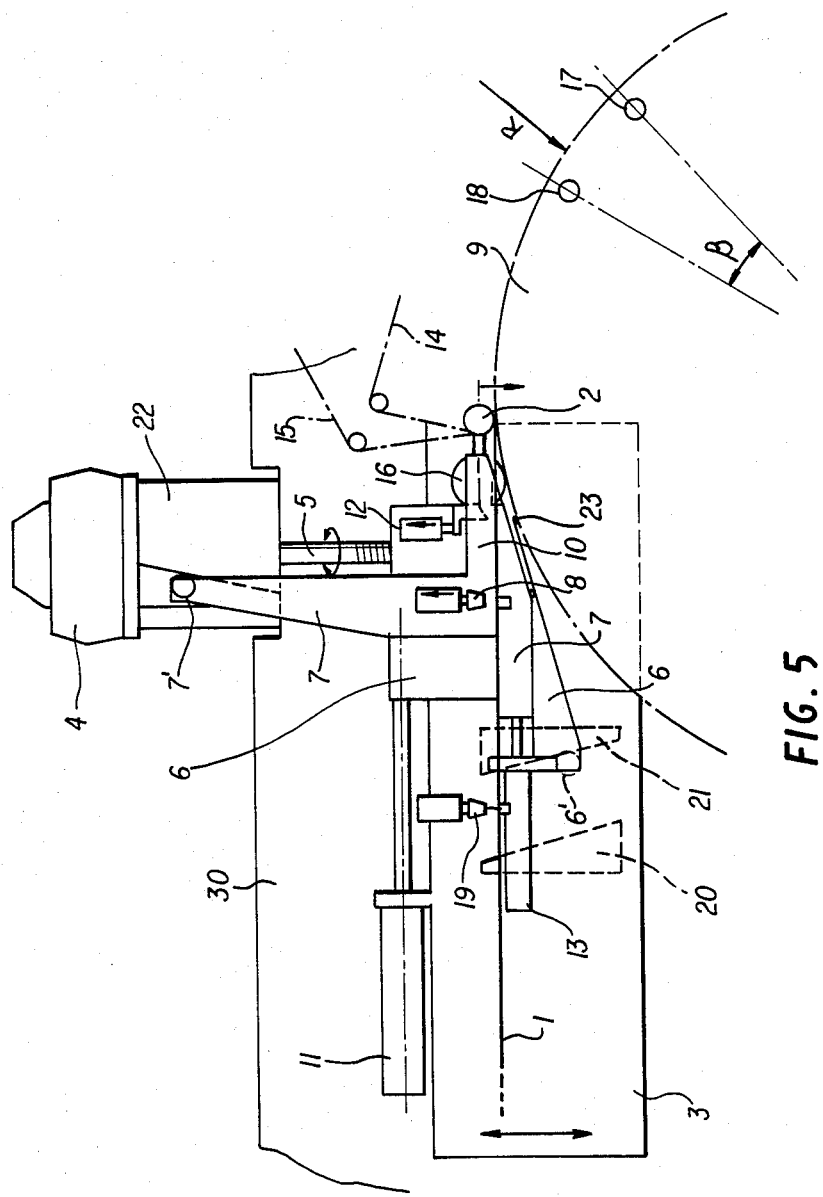
Figure 6:
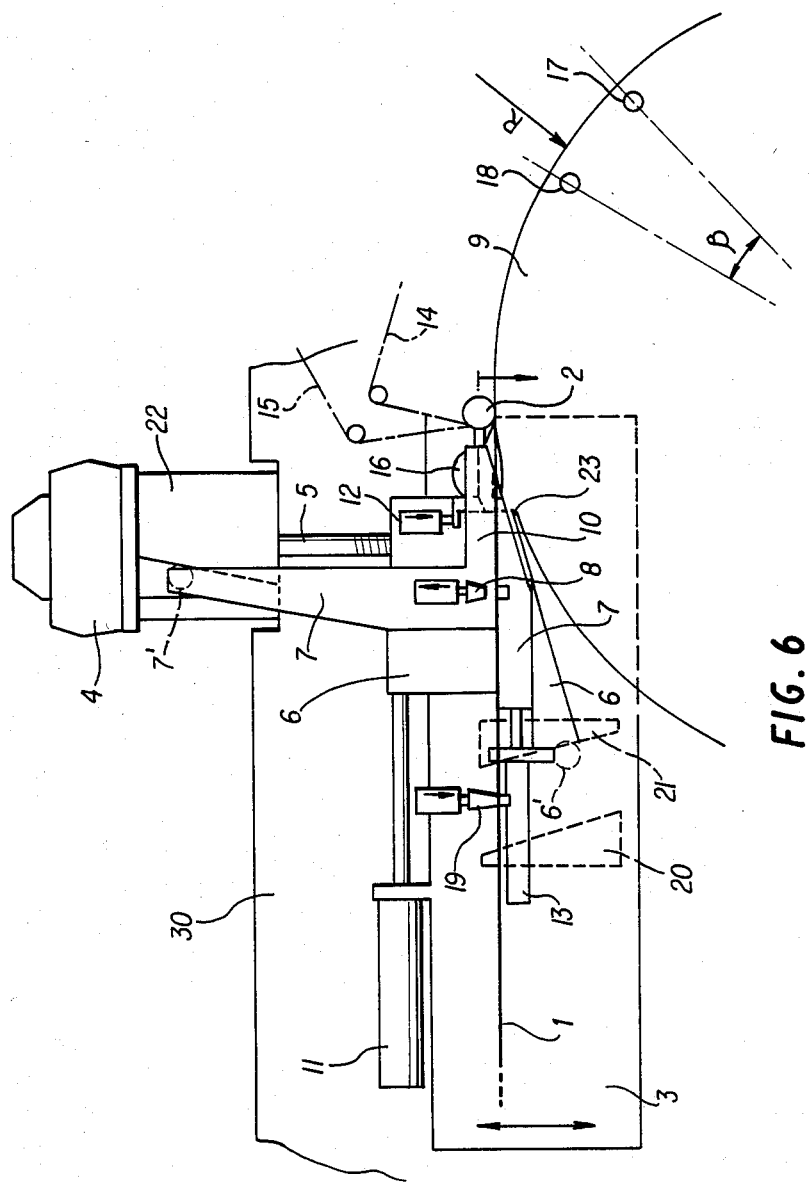

In the next phase (see FIG. 5), the presser roller is again lowered and bears then on insert 1 and films 14 and 15, and the translated control of the main slide 3 is re-established. The mobile clip 8 is then open.

Winding of insert 1 on wheel 9 is then carried out. Wheel 9 rotates through an angle $2\pi-\beta$ until its mark is indexed in a position located by sensor 18. When wheel 9 is in this latter position, the fixed clip 19 is closed and the cutting device 12 carried by the primary slide 6 is actuated.

Figure 7:
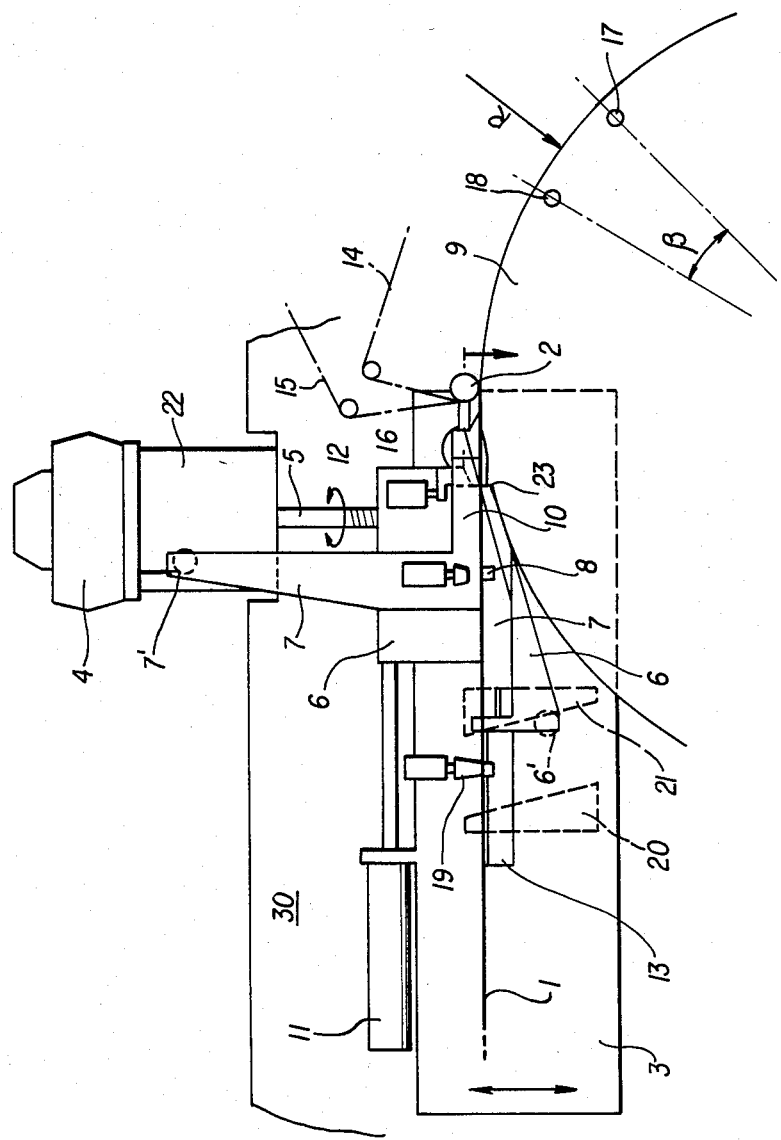

The secondary slide 7 is then returned to its rear stop 23 (see FIG. 7) while leaving the insert 1 in position since the fixed clip 19 is closed and the mobile clip 8 open. The rest position is resumed with return of the primary slide 6 to its rear stop 20 (FIG. 1). Wheel 9 is again rotated and so winds up the remaining insert portion 1 and a new stack of layers of films 14 and 15. It will be readily understood that, since the primary slide 6 which carries the cutting device 12 has been brought back in its travel to the rear stop by a given amount independent of the diameter of the external layers of films 14 and 15, the end of insert 1 will project beyond the insert guide 10 by a given amount which is itself constant.

Figure 8A:
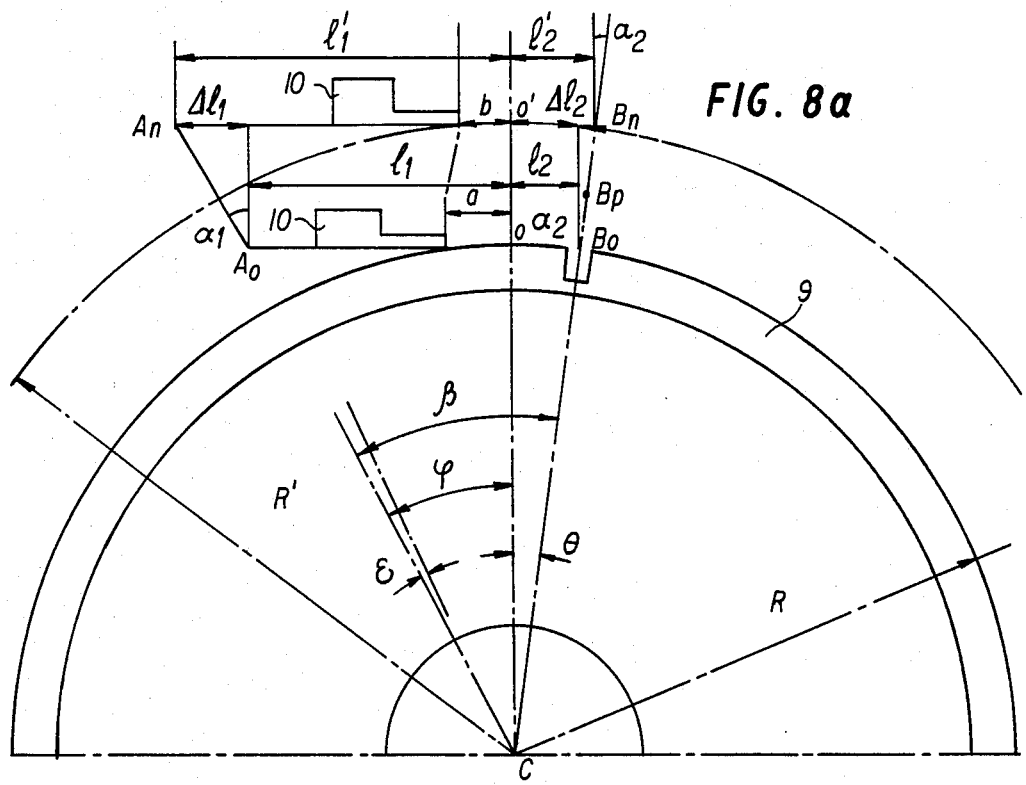
FIG. 8a illustrates the calculation of the angles of the cams and FIG. 8b is a detail of FIG. 8a, showing the positioning of the wheel 2.
Figure 9:
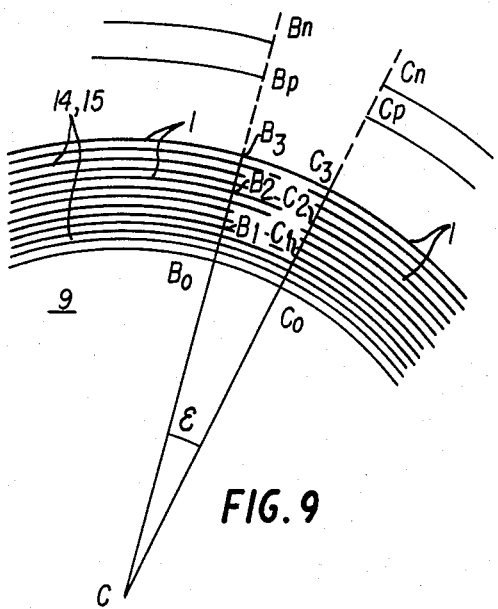
FIG. 9 shows inserts after interpositioning thereof.
Figure 8B:
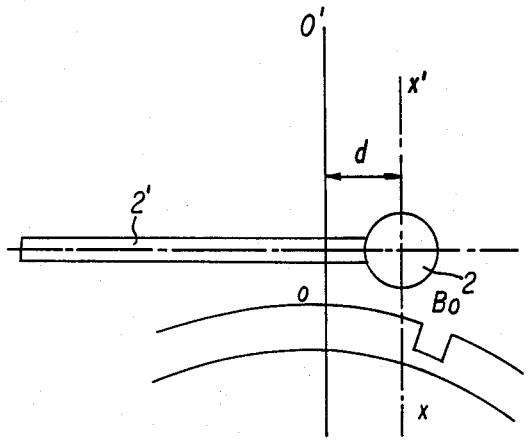

Referring to FIGS. 8a, 8b and 9, the manner in which the angles of the cams are defined will now be described. First of all, the angle of cam 22 is defined. Wheel 9 has an external diameter R. The radius R' is the maximum theoretical radius of the wound layers. When the primary slide 6 is against its front stop 21, the insert 1 arrives tangent to the external layers of the films at a point situated on a segment $OO'$, the extension of a radius CO of wheel 9 with center C. We have $CO = R$ and $CO' = R'$. $OO'$ is perpendicular to the direction of movement of the primary slide 6.

Primary slide 6 brings then the end of insert 1 to the level of segment $OO'$. The secondary slide 7 extends this movement by an amount varying between $l_2$ and $l'_2$ (with $l_2 = OB_o$ and $l'_2 = OB_n$), as far as a segment $B_oB_n$ of a radius of wheel 9 forming an angle $\theta$ with the preceding one. Point $B_p$ corresponds to the $p^{th}$ insert. If we call $\alpha_2$ the slope of cam 22 with respect to radius $OO'$, the increase $\delta\, l_2$ in insert length will be equal to $\delta R \tan\alpha_2$ where $\delta R$ is the increase in the radius of the outer layer. To compensate for angle $\theta$, $\delta\, l_2$ must equal $\theta \delta R$, from which $\tan\alpha_2 = \theta$. The result is that the slope of cam 22 with respect to radius $OO'$ will in a first approximation be equal to $\theta$, since $\theta$ is small.

As shown in FIG. 8b, the axis $XX'$ parallel to $OO'$, over which the shaft of presser roller 2 moves, is staggered by a distance d from segment $OO'$ on the segment $OB_o$ side.

When roller 2 is lowered, the $p^{th}$ insert 1 is pressed against the outer layers of films 14 and 15 over practically the whole length of segment $OB_p$, which facilitates its subsequent advancing by wheel 9.

As was described above, with the $p^{th}$ insert 1 introduced as far as point $B_p$, the wheel is rotated through an angle equal to $2\pi - \beta$, after which the insert is cut.

In so far as the slope of cams 20 and 21 is concerned, it must be such that it compensates for the increase in the circumference corresponding to the rotation of wheel 9 through angle B between cutting and complete winding of the insert 1. Thus, cutting of insert 1 is ensured to a length for alignment of the rear edges ($C_1, C_2, C_3, \ldots, C_p, \ldots, C_a$) thereof after winding (see FIG. 9). Cam 22 has already introduced a correction of length corresponding to an angle $\theta$. The compensation will then be obtained by compensating for an angle $\rho = \beta - \theta$.

As shown in FIG. 9, the edges $B_2, B_2, B_3, \ldots, B_n$ and $C_1, C_2, C_3, \ldots, C_n$ of inserts 1 are preferably located on two radii forming therebetween an angle $\epsilon$ so as to allow a cutting tool to pass therethrough for separating, by cross cutting, the stacked mother capacitors from wheel 9.

Consequently, and to take into account the angular offset, the angle to be compensated for will then be strictly:

$$\rho - \epsilon = \beta - \theta - \epsilon$$

since mark 17 corresponds.

We get $\delta R \tan \alpha_1 = \delta l_1$ and $\delta l_1 = (\beta - \theta - \epsilon)\, \delta R$ The angle $\alpha_1$ of cams 20 and 21 (see FIG. 10b) is then determined by:

$$\tan \alpha_1 = \beta - \theta - \epsilon$$

where $\alpha_1 = \text{Arc}\tan(\rho - \theta - \epsilon)$.

The invention is not limited to the embodiment described and shown. Thus the stops for the slides are cams only if it is desired to compensate for variations in radius of the stacking of the films. Finally, the second slide 7 may be omitted since its function is only to facilitate the presentation of the leading edge of insert 1.

What is claimed is:

1. A process for manufacturing mother capacitors separated by an insert to form a block wherein the insert divides the block into at least two superposed mother capacitors which along with said insert have side edges completely covered with a contact metal, comprising helical winding of metalized films on a wheel as well as periodic interpositioning, after a given number of winding revolutions, of said insert having an input or leading edge and a rear edge, which process comprises an operation for making the position of an insert interpositioning device dependent on the position of the external layer of the winding, and an insert interpositioning operation comprising the steps of stopping said wheel, moving the interpositioning device from a rear, so-called rest, position to a forward position for presenting the insert by its leading edge, setting the wheel again in rotation so as to interposition said insert, moving the interpositioning device from its forward position to its rear position so as to continue winding of the films, and cutting said insert.

2. The process as claimed in claim 1, wherein said insert interpositioning operation comprises an operation for raising a roller pressing on said films for presenting said insert thereunder.

3. The process as claimed in claim 1, wherein said cutting is made with a length increasing linearly with the radius of the external layer of the winding so that the rear edges of the successive inserts are aligned along a radius of said wheel.

4. The process as claimed in claim 3, wherein said interpositioning device carries a cutting device, a mobile clip for advancing said insert which is closed during the movement of the interpositioning device to the forward position, and cams forming a front and rear stop, wherein the cutting step comprises steps for rotating said wheel by a fraction of a revolution, again stopping said wheel, cutting said insert, the interpositioning device being against its front stop, and again rotating the wheel and wherein the profile of said cams is chosen so that said insert is cut by the cutting device to a length such that, after winding, the rear edges of the successive inserts are located along the same radius of said wheel.

5. The process as claimed in claim 4, wherein presentation of said insert is effected with overshooting of the point where it is tangent to the external layer of the winding, so that a segment of the insert is pressed by a presser roller for starting the winding.

6. The process as claimed in claim 5, wherein said overshoot is proportional to the radius of the external layer of the winding, so that the leading edges of the successive inserts are aligned along a radius of said wheel.

7. The process as claimed in claim 6, wherein the movement of said interpositioning device between the rear position and the forward position consists in moving a first means over a given distance between a rear stop and a front stop, and in extending the movement by a second means carried by the first means as far as a front stop formed by a cam profiled so as to effect said proportional movement, said insert being advanced by a mobile clip carried by the second means, the mobile clip being closed for this purpose.

8. The process as claimed in claim 7, wherein the movement of said interpositioning device between the forward position and the rear position consists in moving the second and the first means towards their rear stop while maintaining the mobile clip open.

9. A device for manufacturing mother capacitors separated by an insert to form a block wherein the insert divides the block into at least two superposed mother capacitors which along with said insert have side edges completely covered with a contact metal, comprising a device for helically winding metalized films on a wheel, as well as a device periodically interpositioning said insert after a given number of winding revolutions, wherein the periodic interpositioning device is carried by a mobile compensating device and is adapted to move between a rear, so-called rest, position and a forward position in which the insert is presented at the point where the films join the winding, and further comprising a sensor for detecting the position of the external layer of the winding of the wheel, a control device of the position of the compensating device made dependent on the position of said external layer, and means for cutting said insert.

10. The device as claimed in claim 9, further comprising a roller for pressing the stack and wherein the point where the films join the winding is the point of contact between said presser roller and said winding.

11. The device as claimed in claim 10, wherein said presser roller is associated with a shaft connected to a device for applying the pressure force of the roller, integral with the compensating device, said sensor being adapted to measure the angular position of said shaft and said control is arranged for moving said compensating device so that said shaft maintains a given angular position.

12. The device as claimed in claim 11, wherein said sensor is formed by two photo-electric barriers disposed on each side of said given angular position of said shaft and said control device is of the all or nother type.

13. The device as claimed in claim 11, wherein said device for applying the pressure force is a stepper motor and said sensor is a circuit for decoding the angular position of said stepper motor.

14. The device as claimed in claim 10, comprising a frame which carries a fixed clip.

15. The device as claimed in claim 10, wherein said interpositioning device comprises a first means carrying a mobile clip for advancing said insert, a cutting device, and an insert introducing device.

16. The device as claimed in claim 10, wherein said interpositioning device comprises a first means movable between a forward stop and a rear stop and carrying a cutting device, and a second means movable between a forward stop and a rear stop, said second means carrying a mobile clip for advancing said insert as well as an insert introducing device.

17. The device as claimed in claim 16, wherein the forward stop of said second means is a cam whose profile is chosen so as to position the leading edges of the successive inserts on the same radius of said wheel.

18. The device as claimed in claim 17, wherein said cam is a slide.

19. The device as claimed in claim 15, wherein the first means comprises stops implemented by means of first and second cams which have profiles chosen so that said insert is cut by the cutting device to a length such that, after winding, the rear edges of the successive inserts are located along the same radius of the wheel.

20. The device as claimed in claim 19, wherein at least one of said first and second cams is a slide.

21. The device as claimed in claim 17, wherein the stops of said first means comprise cams having profiles chosen so that said insert is cut by the cutting device to a length such that, after winding, the rear edges of the successive inserts are located along the same radius of the wheel.

22. The device as claimed in claim 21, wherein at least one of said cams of said first means is a slide.

* * * * *